(12) United States Patent
Pawson et al.

(10) Patent No.: US 8,977,760 B2
(45) Date of Patent: Mar. 10, 2015

(54) SYSTEM AND METHOD FOR ROUTING SUPL PROXY-MODE TRAFFICE WHEN MULTIPLE NODES ARE DEPLOYED IN A NETWORK

(75) Inventors: Darren Pawson, Flinders (AU); Chas Singh, Wollongong (AU)

(73) Assignee: Commscope, Inc. of North Carolina, Hickory, NC (US)

( * ) Notice: Subject to any disclaimer, the term of this patent is extended or adjusted under 35 U.S.C. 154(b) by 122 days.

(21) Appl. No.: 13/123,306

(22) PCT Filed: Nov. 23, 2009

(86) PCT No.: PCT/US2009/065511
§ 371 (c)(1),
(2), (4) Date: Apr. 8, 2011

(87) PCT Pub. No.: WO2010/065369
PCT Pub. Date: Jun. 10, 2010

(65) Prior Publication Data
US 2011/0231561 A1    Sep. 22, 2011

Related U.S. Application Data

(60) Provisional application No. 61/193,541, filed on Dec. 5, 2008.

(51) Int. Cl.
| | |
|---|---|
| G06F 15/177 | (2006.01) |
| H04W 36/00 | (2009.01) |
| H04N 7/16 | (2011.01) |
| H04W 4/02 | (2009.01) |
| H04W 4/20 | (2009.01) |
| H04L 29/08 | (2006.01) |

(52) U.S. Cl.
CPC ...... *H04W 4/02* (2013.01); *H04W 4/20* (2013.01); *H04L 67/1002* (2013.01); *H04L 67/1014* (2013.01); *H04L 67/1012* (2013.01)
USPC .............. 709/228; 709/220; 725/15; 455/433

(58) Field of Classification Search
CPC ........... H04W 4/02; H04W 4/20; H04W 8/26; H04L 67/1012; H04L 63/0281
See application file for complete search history.

(56) References Cited

U.S. PATENT DOCUMENTS

| | | |
|---|---|---|
| 6,097,709 A | 8/2000 | Kuwabara |
| 6,108,558 A | 8/2000 | Vanderspool, II |
| 6,115,605 A | 9/2000 | Siccardo et al. |

(Continued)

OTHER PUBLICATIONS

OMA_SUPL Version 1.0—Jan. 27, 2006.*

(Continued)

*Primary Examiner* — Joshua Joo
*Assistant Examiner* — Younes Naji
(74) *Attorney, Agent, or Firm* — Tarolli, Sundheim, Covell & Tummino LLP

(57) ABSTRACT

A system and method for connecting a mobile device to a node in a wireless network. A query may be received for a mobile device from a location based application. In response to the query a first message may be transmitted to the mobile device from a first node, the first message being populated with at least one predetermined parameter. At a second node, it may then be determined whether to forward a second message from the mobile device to the first node via the second node as a function of the availability of the first node or the at least one predetermined parameter.

17 Claims, 8 Drawing Sheets

(56) References Cited

U.S. PATENT DOCUMENTS

| | | | |
|---|---|---|---|
| 6,269,246 | B1 | 7/2001 | Rao et al. |
| 6,281,834 | B1 | 8/2001 | Stilp |
| 6,393,294 | B1 | 5/2002 | Perez-Breva et al. |
| 6,449,486 | B1 | 9/2002 | Rao |
| 6,591,112 | B1 | 7/2003 | Siccardo et al. |
| 6,782,265 | B2 | 8/2004 | Perez-Breva et al. |
| 6,944,465 | B2 | 9/2005 | Spain et al. |
| 7,116,987 | B2 | 10/2006 | Spain, Jr. et al. |
| 7,167,714 | B2 | 1/2007 | Dressler et al. |
| 7,209,977 | B2 * | 4/2007 | Acharya et al. ............... 709/240 |
| 7,233,799 | B2 | 6/2007 | Spain, Jr. |
| 7,250,907 | B2 | 7/2007 | Krumm et al. |
| 7,257,414 | B2 | 8/2007 | Spain, Jr. et al. |
| 7,383,051 | B2 | 6/2008 | Spain, Jr. et al. |
| 7,433,652 | B2 | 10/2008 | Durgin |
| 7,433,695 | B2 | 10/2008 | Gordon et al. |
| 7,460,505 | B2 | 12/2008 | Spain |
| 7,725,111 | B2 | 5/2010 | Dressler et al. |
| 7,734,298 | B2 | 6/2010 | Bhattacharya et al. |
| 7,753,278 | B2 | 7/2010 | Spain, Jr. et al. |
| 7,796,966 | B2 | 9/2010 | Bhattacharya et al. |
| 7,822,425 | B2 * | 10/2010 | Shim et al. ................. 455/456.1 |
| 7,848,762 | B2 | 12/2010 | Gordon et al. |
| 7,899,467 | B2 | 3/2011 | Feuerstein et al. |
| 7,936,763 | B2 * | 5/2011 | Forissier et al. ............ 370/395.3 |
| 8,013,785 | B2 | 9/2011 | Bhattacharya et al. |
| 8,068,802 | B2 | 11/2011 | Bhattacharya et al. |
| 8,068,855 | B2 | 11/2011 | Dressler et al. |
| 8,106,817 | B2 | 1/2012 | Bhattacharya et al. |
| 8,106,818 | B2 | 1/2012 | Bhattacharya et al. |
| 8,155,394 | B2 | 4/2012 | Allegra et al. |
| 2004/0203539 | A1 | 10/2004 | Benes et al. |
| 2006/0225090 | A1 | 10/2006 | Shim et al. |
| 2006/0245406 | A1 | 11/2006 | Shim |
| 2007/0072624 | A1 * | 3/2007 | Niemenmaa et al. ...... 455/456.1 |
| 2007/0182547 | A1 * | 8/2007 | Wachter et al. .......... 340/539.13 |
| 2007/0243885 | A1 * | 10/2007 | Shim ......................... 455/456.2 |
| 2008/0113671 | A1 * | 5/2008 | Ghozati et al. ............. 455/456.1 |

OTHER PUBLICATIONS

OMA—Secure User PLane Location Achitecture—Jan. 27, 2006—Version 1.0.*

Rick Roberts, "Project: IEEE P802.15 Working Group for Wireless Personal Area Networks (WPANS)," Harris Corporation, Melbourne Florida, Oct. 4, 2004, pp. 1-11.

Stephanie Bell, A Beginners Guide to Uncertainty of Measurement, The National Physics Laboratory of the United Kingdom of Great Britain and Northern Ireland, Teddington, Middlesex, UK, 2001, pp. 1-41.

* cited by examiner

SYSTEM AND METHOD FOR ROUTING SUPL PROXY-MODE TRAFFICE WHEN MULTIPLE NODES ARE DEPLOYED IN A NETWORK

RELATED APPLICATIONS

The instant application claims the priority filing date benefit of U.S. Provisional Application No. 61/193,541 filed Dec. 5, 2008, entitled "System and Method for Routing SUPL Proxy-Mode Traffic When Multiple Nodes are Deployed in a Network," the entirety of which is incorporated herein by reference.

BACKGROUND

This disclosure generally relates to position or location approaches in GSM, CDMA, and UMTS networks. Further, this disclosure relates to user and control plane location approaches in core networks and GERAN, UTRAN, and Complementary Access radio access networks.

Mobile communications infrastructure is typically conceptualized in two generally separate components: the core network ("CN"); and the radio access network (RAN). Together, this infrastructure enables user equipment ("UE"), the RAN, and CN to be developed and implemented separately according to the permissive standards set by organizations such as 3GPP and ITU. Thus, various types of RANs, such as GERAN or UTRAN, can be paired with a single UMTS CN. Also, the UMTS standards provide for protocol separation between data related to user communications and data related to control of the network's various components. For example, within a UMTS mobile communications network, User Plane ("UP") bearers are responsible for the transfer of user data, including but not limited to voice or application data. Control Plane ("CoP") bearers handle control signaling and overall resource management.

As mobile networks transition towards 3G and beyond, location services (LCS, applications of which are sometimes referred to as Location Based Services, or LBS) have emerged as a vital service component enabled or provided by wireless communications networks. In addition to providing services conforming to government regulations such as wireless E911, LCS solutions also provide enhanced usability for mobile subscribers and revenue opportunities for network operators and service providers alike.

Position includes geographic coordinates, relative position, and derivatives such as velocity and acceleration. Although the term "position" is sometimes used to denote geographical position of an end-user while "location" is used to refer to the location within the network structure, these terms may often be used interchangeably without causing confusion. Common position measurement types used in mobile positioning or LCS include, but are not limited to, range, proximity, signal strength (such as path loss models or signal strength maps), round trip time, time of arrival, and angle of arrival. Multiple measurements can be combined, sometimes depending on which measurement types are available, to measure position. These combination approaches include, but are not limited to, radial (for example, employing multiple range measurements to solve for best agreement among circular loci), angle (for example, combining range and bearing using signal strength or round trip time), hyperbolic (for example, using multiple time-of-arrival), and real time differencing (for example, determining actual clock offsets between base stations).

Generally, LCS methods are accomplished through CoP or UP methods. CoP Location ("CoPL") refers to using the control signaling channel within the network to provide location information of the subscriber or UE. UP Location ("UPL"), such as Secure User Plane Location ("SUPL") uses the user data channel to provide location information. CoPL location approaches include, but are not limited to, Angle-of-Arrival ("AoA"), Observed Time-Difference-of-Arrival ("OTDoA"), Observed-Time-Difference ("OTD"), Enhanced-OTD ("E-OTD"), Enhanced Cell-ID ("E-CID"), Assisted Global Positioning System ("A-GPS"), and Assisted Galileo Navigation Satellite System ("A-GNSS"). UPL approaches include, but are not limited to, A-GPS, A-GNSS, and E-CID, where this position data is communicated over Internet Protocol ("IP").

There are two established architectures associated with location determination in modern cellular networks. The architectures are Control Plane ("CoP") and User Plane ("UP") architectures. Typically location requests are sent to a network through a query gateway function 1. Depending on the network implementation CoP 15 or UP 10 may be used but not a combination of both, as shown in FIG. 1. Note that queries may also come directly from the target device itself rather than via a gateway. Similarly, CoP or UP may be used but not both.

The difference between user plane and control plane, strictly, is that the former uses the communication bearer established with the device in order to communicate measurements. The latter uses the native signaling channels supported by the controlling network elements of the core and access to communicate measurements. As such, a CoPL solution supporting A-GPS would use its control plane signaling interfaces to communicate GPS data to/from the handset. Similarly UPL can conduct E-OTD—the handset takes the timing measurements but it communicates them to the location platform using the data bearer.

UPL has the advantage of not depending on specific access technology to communicate measurement information. CoPL has the advantage that it can access and communicate measurements which may not be available to the device. Current models require network operators to deploy one or the other; CoPL or UPL.

Control Plane Location ("CoPL") uses the native signaling plane of the network to establish sessions and communicate messages associated with location requests and to communicate measurements used for determining location. The control plane is the signaling infrastructure used for procedures such as call control, hand-off, registration, and authentication in a mobile network; CoPL uses this same infrastructure for performing location procedures. CoPL can utilize measurements made by both the control plane network elements as well as the end-user device being located.

FIG. 2A illustrates an exemplary architectural diagram of CoPL. A mobile station or mobile appliance 101 communication with a base transceiver station ("BTS") 105 via wireless interface Urn. A base station controller ("BSC") 107 manages radio resources including the BTS 105 via an Abis interface. The Abis interface is an open interface completely defined as part of the ETSI specification for GSM and carries the call set up information, including voice channel assignments between the BSC 107 and BTS 105. A mobile switching center/visitor's location register ("MSC/VLR") 113 coordinates between the mobile appliance communication network and a gateway mobile location center ("GMLC") 117.

In operation, a location measurement device (not shown) may be connected to the BSC 107 via the Abis wire line interface and makes measurements on the RF signals of the Um interface, along with other measurements to support one or more of the position methods associated with the CoPL. Measurements from the location measurement units are sent to a servicing mobile location center ("SMLC") 109 via BSC 107 where the location of an MS 101 can be determined. The BTS 105, BSC 107 and SMLC 109 form a base station subsystem ("BSS") 103. The GMLC 117 is connected to a home location register ("HLR") 111 over an Lh interface and the MSC/VLR 113 over an Lg interface. A gateway mobile switching center ("GMSC") 115 is operably connected to the MSC/VLR 113 to allow interconnection with other networks.

The operation of a CoPL architecture is shown in FIG. 2B. This shows the 3GPP location service architecture. A gateway mobile location centre ("GMLC") 117 is the network element that receives the location requests. The GMLC queries the HLR 111 over the Lh interface to find out which part of the access network 107 is currently serving the target device. The GMLC 117 sends a location request to the current serving core network node 113 via the Lg interface. The current serving core network node 113 (e.g., MSC or serving GPRS service node ("SGSN")) then passes the request to the part of the access network 107 attached to the target device (e.g., GERAN BSC or UTRAN RNC). This access network element 107 then invokes the facilities of the SMLC 109. The location request session between the access network node 107 and the SMLC 109 provides a channel by which the SMLC 109 can ask for network measurements or to send messages to the end-user device 101 so that device measurement information can be exchanged. The SMLC 109 may also obtain location measurement information from external devices 110 such as location measurement units ("LMUs") which take RF readings from the air interface. Similarly, the device may also take measurements from external systems, such as GPS satellites, and communicate these to the SMLC 109.

Developed as an alternative to CoPL, Secure User Plane Location ("SUPL") is set of standards managed by the Open Mobile Alliance ("OMA") to transfer assistance data and positioning data over IP to aid network and terminal-based positioning technologies in ascertaining the position of a SUPL Enabled Terminal ("SET").

User Plane Location ("UPL") does not explicitly utilize the control plane infrastructure. Instead UPL assumes that a data bearer plane is available between the location platform and the end-user device. That is, a control plane infrastructure may have been involved in establishing the data bearer so that communication can occur with the device but no location-specific procedural signaling occurs over the control plane. As such, UPL is limited to obtaining measurements directly from the end-user device itself.

SUPL includes a Lup reference point, the interface between the SUPL Location Platform ("SLP") and SET, as well as security, authentication, authorization, charging functions, roaming, and privacy functions. For determining position, SUPL generally implements A-GPS, A-GNSS, or similar technology to communicate location data to a designated network node over Internet Protocol ("IP").

FIG. 3A illustrates an exemplary architectural diagram for SUPL. The illustrated entities represent a group of functions, and not necessarily separate physical devices. In the SUPL architecture, an SLP 201 and SET 207 are provided. The SLP 201 may include a SUPL Location Center ("SLC") 203 and a SUPL Positioning Center ("SPC") 205. The SLC and SPC optionally communicate over the LIp interface, for instance, when the SLC and SPC are deployed as separate entities. The SET 207 generally includes a mobile location services ("MLS") application, an application which requests and consumes location information, or a SUPL Agent, a service access point which accesses the network resources to obtain location information.

For any SET, an SLP 201 can perform the role of the home SLP ("H-SLP"), visited SLP ("V-SLP") or emergency SLP ("E-SLP"). An H-SLP for a SET includes the subscription, authentication, and privacy related data for the SET and is generally associated with a part of the SET's home public land mobile network ("PLMN"). A V-SLP for a SET is an SLP selected by an H-SLP or E-SLP to assist in positioning thereof and is associated with or contained in the PLMN serving the SET. The E-SLP may perform positioning in association with emergency services initiated by the SET.

The SLC 203 coordinates operations of SUPL in the network and interacts with the SET over the User Plane bearer to perform various functions including, but not limited to, privacy, initiation, security, roaming, charging, service management, and positioning calculation. The SPC 205 supports various functions including, but not limited to, security, assistance delivery, reference retrieval, and positioning calculation.

SUPL session initiation is network-initiated or SET-initiated. The SUPL architecture provides various alternatives for initiating and facilitating SUPL functions. For example, a SUPL Initiation Function ("SIF") is optionally initiated using a Wireless Application Protocol Push Proxy Gateway ("WAP PPG") 211, a Short Message Service Center ("SMSC/MC") 213, or a User Datagram Protocol/Internet Protocol ("UDP/IP") 215 core, which forms user plane bearer 220.

The operation of UPL is shown in FIG. 3B. Secure User Plane Location is a standard specification for UPL. Location requests come to the SLP 201 from external applications or from the end-user device itself. If a data session does not exist between the SLP 201 and the device 207 already, then the SLP 201 may initiate a request such that an IP session (user plane bearer 220) is established between the device 207 and the SLP 201. From then on, the SLP 201 may request measurement information from the device 207. The device may also take measurements from the network 107 or from external systems such as GPS 210. Because there is no control plane connectivity to the network, the SLP 201 cannot directly request any measurement information from the network 107 itself. More information on SUPL, including the Secure User Plane Location Architecture documentation (OMA-AD-SUPL), can be readily obtained through OMA.

SUMMARY

In SUPL, each SET has a securely provisioned (or derived) H-SLP address. In proxy-mode, the SET generally connects to this address for any query (SET-initiated and network-initiated). The SUPL specifications only discuss a single H-SLP being present in the network. There are various reasons why a network operator would want to deploy more than one H-SLP (e.g., scaling capacity reasons and geographic redundancy). This kind of deployment is considered beyond the scope of the current SUPL specifications.

Therefore, considering the situation where multiple H-SLPs are deployed, these SLPs must share the H-SLP address provisioned in the SET. This may be easily achieved by using a standard global server load balancer ("GSLB") in front of the H-SLPs. For SET-initiated queries, the SET's H-SLP fully qualified domain name ("FQDN") resolves to the GSLB, and this GSLB simply routes the connection through to any H-SLP.

However, a problem exists with network-initiated queries. With reference to FIG. 4, for network initiated queries, there currently is no mechanism that would allow the SET to connect specifically to the H-SLP that initiated the query. For example, a location based application ("LBA") may make a Mobile Location Protocol ("MLP") query to an arbitrary SLP at 401. The SLP may then send a SUPL INIT message to the SET via WAP PUSH, SMS or UDP at 402. The SET would establish a TLS connection to its provisioned H-SLP at 403, and the SET would send a SUPL POS NIT message on this connection to continue the session at 404. The SUPL POS NIT message must, however, end up at the SLP which initiated the query at 405. Due to security constraints the SLP cannot simply pass an address to which the SET can blindly connect.

Therefore, a need exists in the industry to solve this routing problem in the network-initiated case, thereby allowing multiple H-SLPs to be deployed in a communications network. In one embodiment a method for connecting a mobile device to a node in a wireless network is provided. The method may comprise the steps of receiving a query for a mobile device from a location based application, transmitting a first message to the mobile device from an initiating node in response to the query, the first message being populated with predetermined parameters and establishing a transport layer security ("TLS") connection to the initiating node. A second message may then be forwarded from the mobile device to the initiating node as a function of one or more of the parameters in the first message.

Another embodiment of the present subject matter provides a method for connecting a mobile device to a node in a wireless network. The method may include the steps of receiving a query for a mobile device from a location based application, transmitting a first message to the mobile device from an initiating node in response to the query, the first message being populated with predetermined parameters, and establishing a TLS connection to a second node. A second message may be forwarded from the mobile device to the initiating node via the second node as a function of one or more of the parameters in the first message. In one embodiment the forwarding may include determining at the second node whether the parameter identifies the second node as the initiating node. If the parameter in the second message fails to identify the second node as the initiating node, then the second message may be forwarded to a third node as a function of the parameter.

One embodiment of the present subject matter may provide a method for connecting a mobile device to a node in a wireless network. The method may include the steps of receiving a query for a mobile device from a location based application, transmitting a first message to the mobile device from an initiating node in response to the query, the first message being populated with predetermined parameters, and establishing a TLS connection to a second node. A second message may be forwarded from the mobile device to the initiating node via the second node by associating a parameter with the initiating node. In one embodiment, this forwarding may include terminating the established TLS connection from the mobile device and examining the content of the second message as a function of the message header. If the header does not include the parameter, a connection may be established between the mobile device any node in the network as a function of the availability of the node. If the header includes the parameter, then the parameter may be extracted from the header, an Internet protocol address associated with the parameter determined, and a connection between the mobile device and the initiating node established.

In a further embodiment of the present subject matter a method for connecting a mobile device to a node in a wireless network is provided. The method may include the steps of receiving a query for a mobile device from a location based application, transmitting a first message to the mobile device from an initiating node in response to the query, the first message being populated with predetermined parameters. The mobile device then determines the route to the initiating node by the augmentation of information it contains with information received in the first message, thereby allowing it to establish a TLS connection to the initiating node.

In an additional embodiment of the present subject matter a method for connecting a mobile device to a node in a wireless network is provided. The method may include the steps of receiving a query for a mobile device from a location based application and transmitting a first message to the mobile device from a first node in response to the query, the first message being populated with at least one predetermined parameter. It may then be determined at a second node whether to forward a second message from the mobile device to the first node via the second node as a function of the availability of the first node or the at least one predetermined parameter.

BRIEF DESCRIPTION OF THE DRAWINGS

Various aspects of the present disclosure will be or become apparent to one with skill in the art by reference to the following detailed description when considered in connection with the accompanying exemplary non-limiting embodiments.

DETAILED DESCRIPTION

With reference to the figures where like elements have been given like numerical designations to facilitate an understanding of the present subject matter, the various embodiments of a system and method for routing SUPL proxy-mode traffic when multiple nodes are deployed in a network.

One embodiment of the present subject matter provides a domain name server ("DNS") based solution. Generally, this embodiment may include small changes in the SET in the way the provisioned H-SLP FQDN is resolved to an IP address via a DNS thereby allowing the correct H-SLP to be identified prior to the SET establishing the connection.

Figure 1:
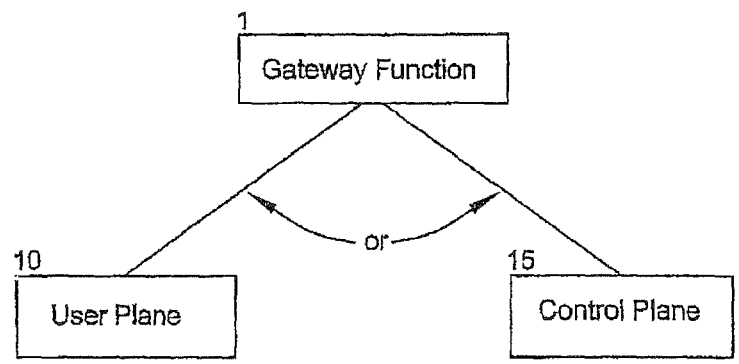
FIG. 1 is an illustration of a prior art gateway function.
Figure 2B:
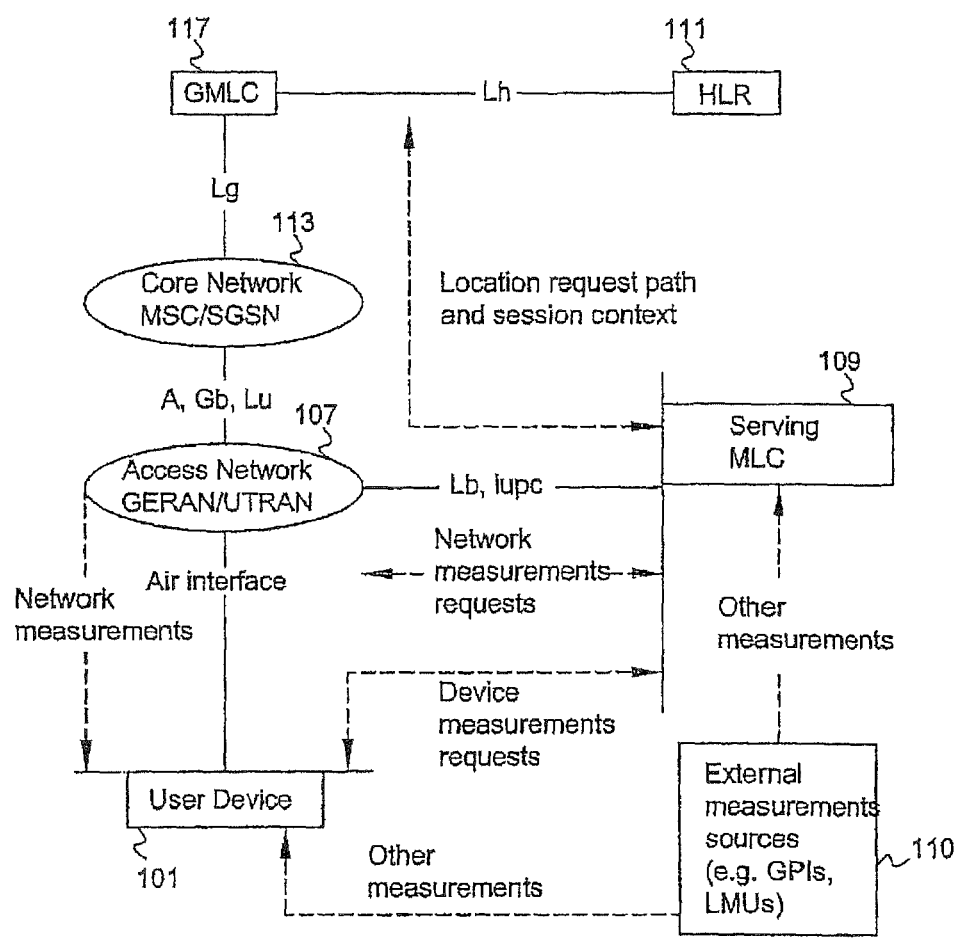
FIG. 2B is an illustration of the operation of an exemplary CoPL architecture.
Figure 2A:
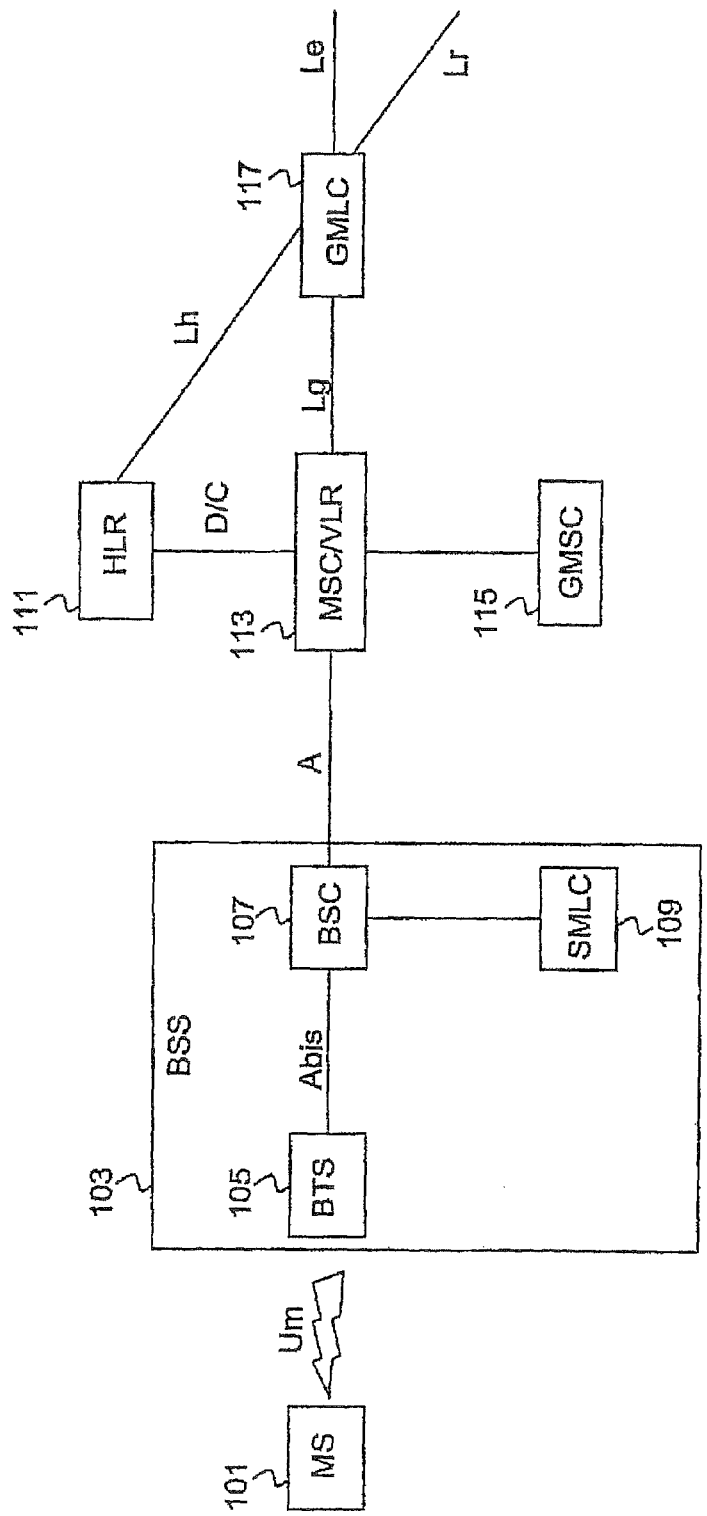
FIG. 2A is an illustration of an exemplary architectural diagram for CoPL.
Figure 3A:
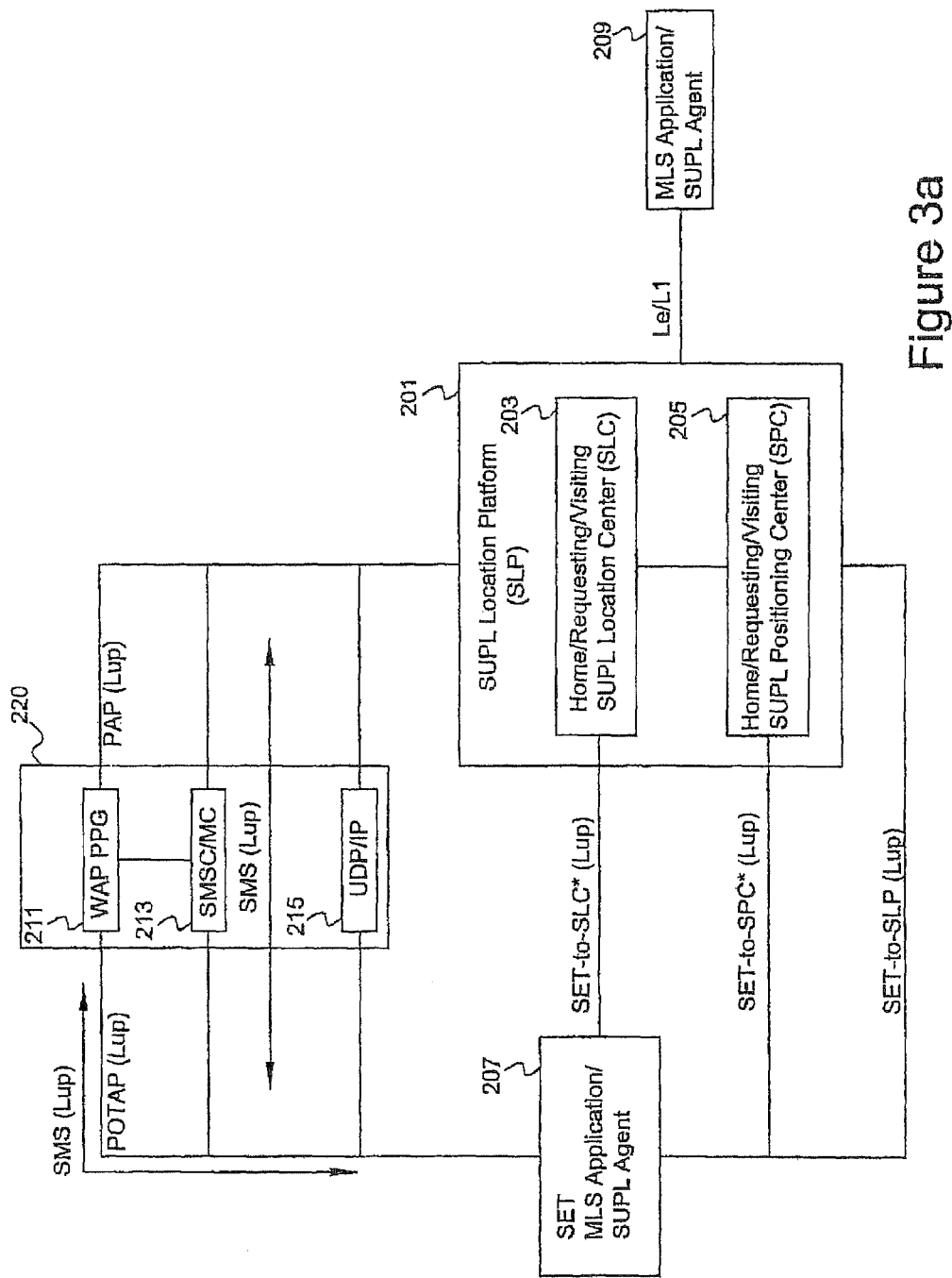
FIG. 3A is an illustration of an exemplary architectural diagram for SUPL.
Figure 3B:
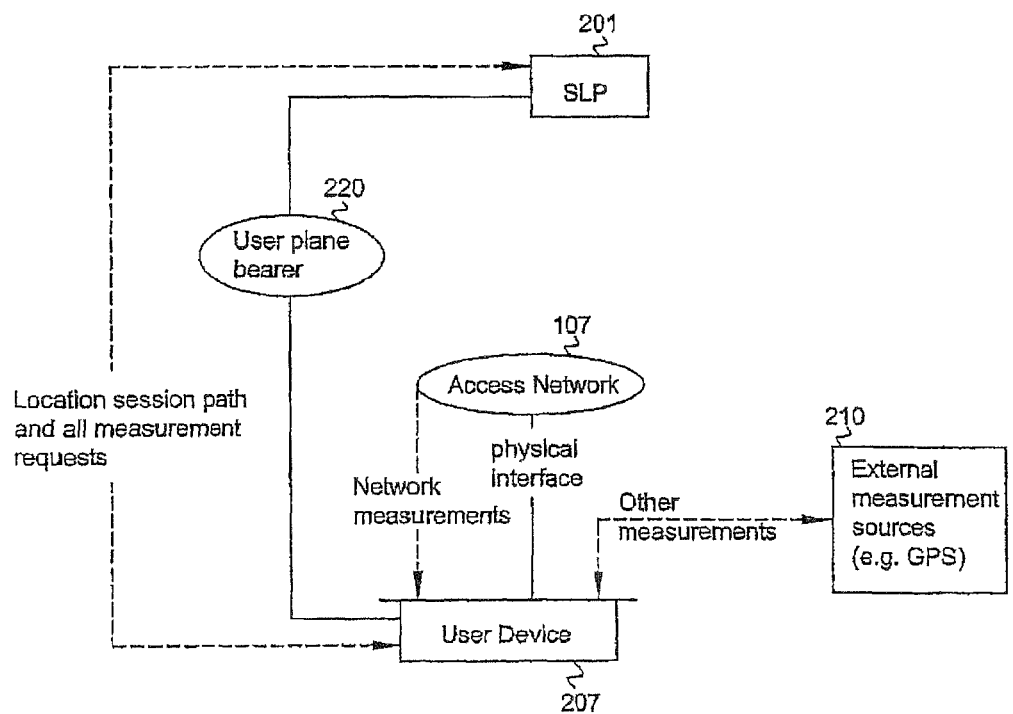
FIG. 3B is an illustration of the operation of an exemplary SUPL architecture.
Figure 4:
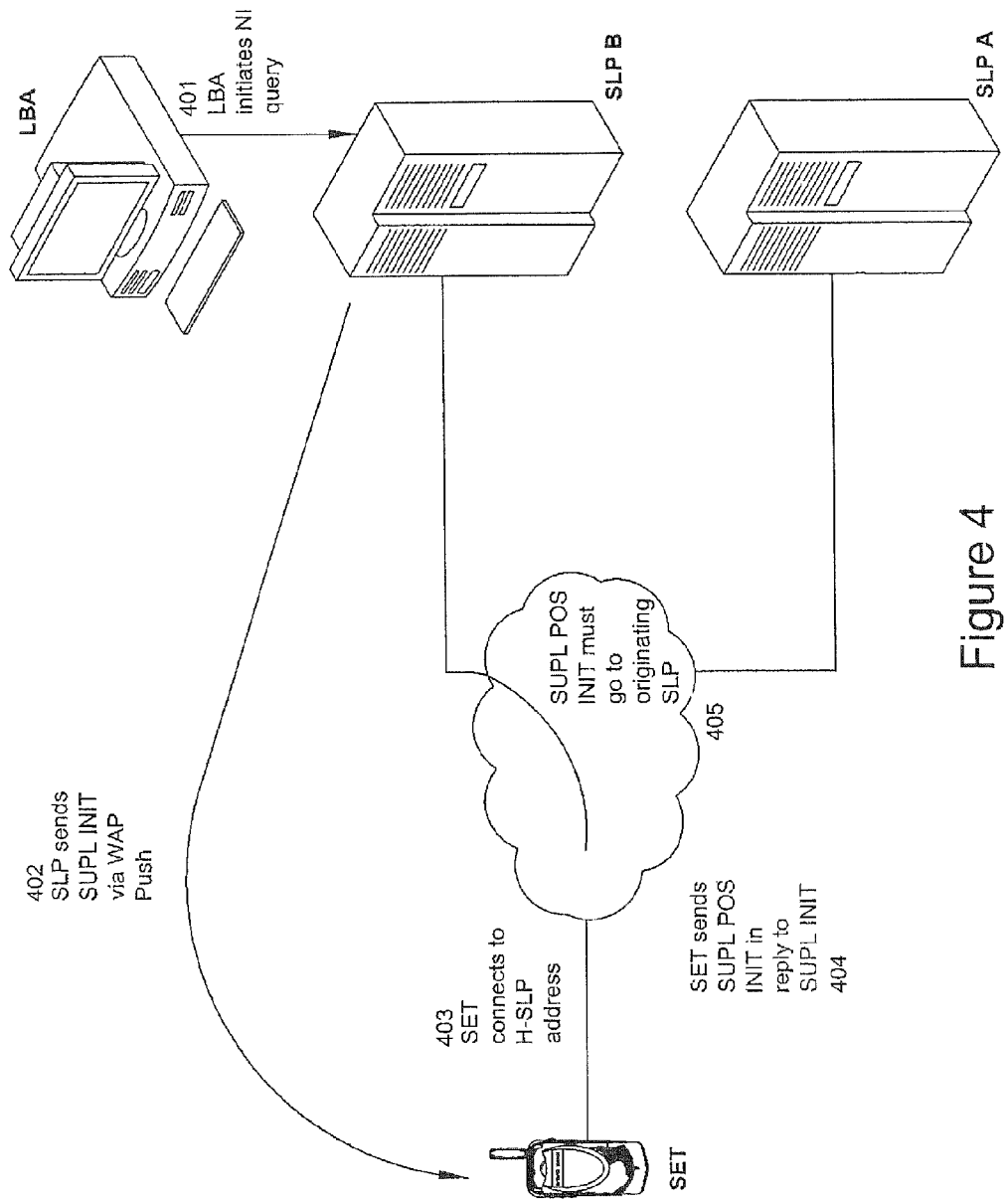
FIG. 4 is a diagram of network initiated SUPL messaging.
Figure 5:
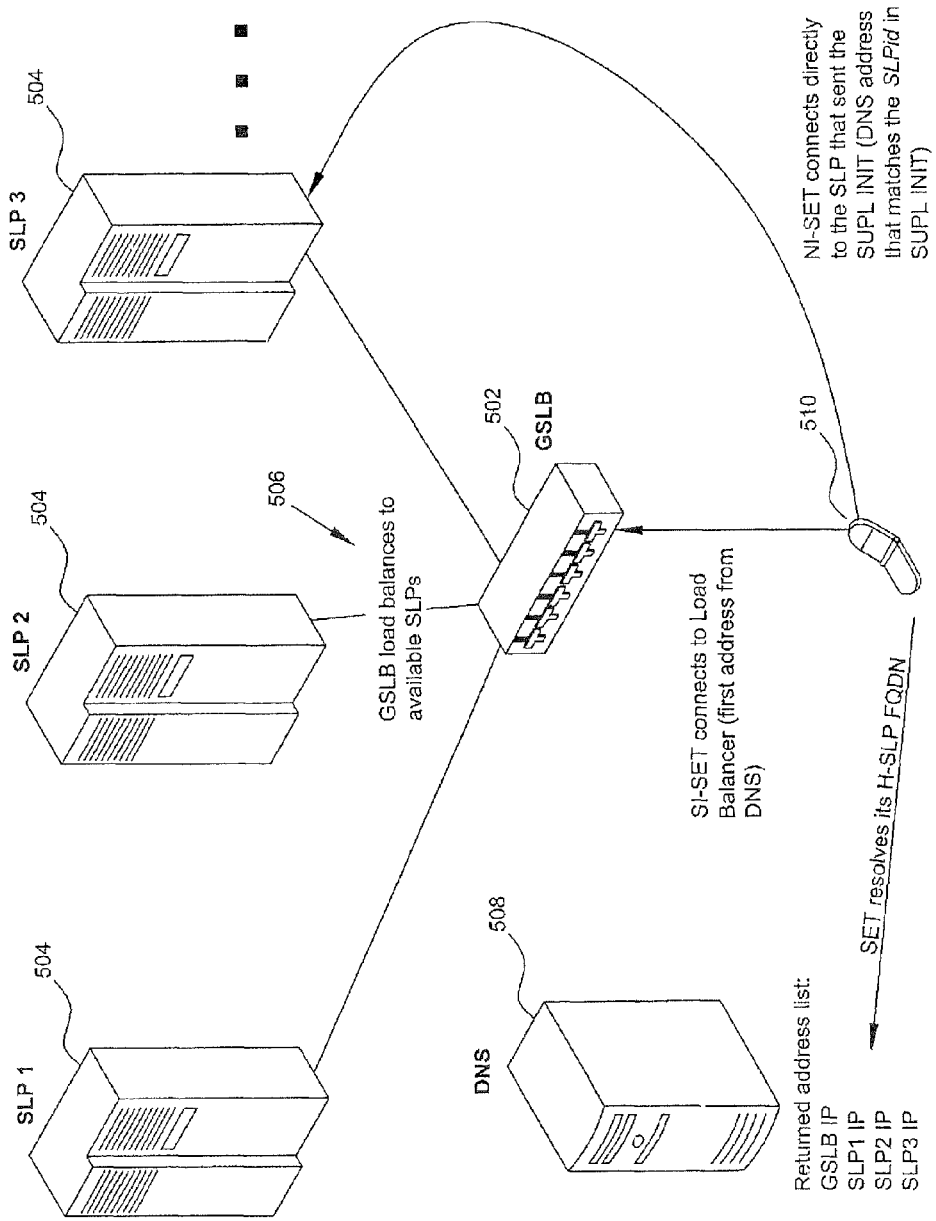
FIG. 5 is an illustration of one embodiment of the present subject matter.

The SUPL specifications do not go into any detail regarding how the SET resolves its provisioned H-SLP FQDN to an IP address to which the SET should connect. One embodiment of the present subject provides a novel method such that the SET is able to connect directly to the H-SLP that sent the SUPL INIT. FIG. 5 is an illustration of one embodiment of the present subject matter. With reference to FIG. 5, a global server load balancing ("GSLB") mechanism 502 may be placed in front of the SLPs 504. This load balancer 502 may distribute connection attempts to available SLPs at 506 (e.g., round robin, least connections, etc.) and provides no additional SUPL intelligence.

For Network-initiated queries, when sending the SUPL INIT message, the SLP 504 may populate the "SLPId" field of the SessionId (in the SUPL messaging header) with the SET-routable IP address of the SLP 504. The DNS server 508 may then be configured to return multiple IP addresses for the single securely provisioned FQDN in the SET 510. The first address in this list is that of the global server load balancer 502, the remaining addresses are the individual H-SLP addresses 504. It should be noted that DNS load balancing may not be used, and hence the order of these returned addresses does not change.

For a SET-initiated query, the SET 510 may utilize the first address returned from the DNS 508, which is the GSLB 502 resulting in any SLP 504 being chosen to service the query. For a network-initiated query, the SET 510 connects to the address in the DNS list that matches the SLPId received in the SUPL INIT message. It should be noted that the address provided in the SUPL INIT is not blindly being utilized by the SET 510 to establish the connection; rather, the address is being utilized in conjunction with the addresses returned as a result of resolving the provisioned H-SLP FQDN (if no match is found in the DNS address list the message would be dropped). As such, this is not viewed as any less secure than standard SUPL messaging where no address is passed in the SLPId field.

Another embodiment of the present subject matter provides an SLP-relay solution which involves H-SLPs communicating between each other so an incorrectly chosen H-SLP may relay the messaging to the correct H-SLP. This embodiment requires no changes in a handset but may require custom SLP behavior to proxy queries between SLPs.

Figure 6:
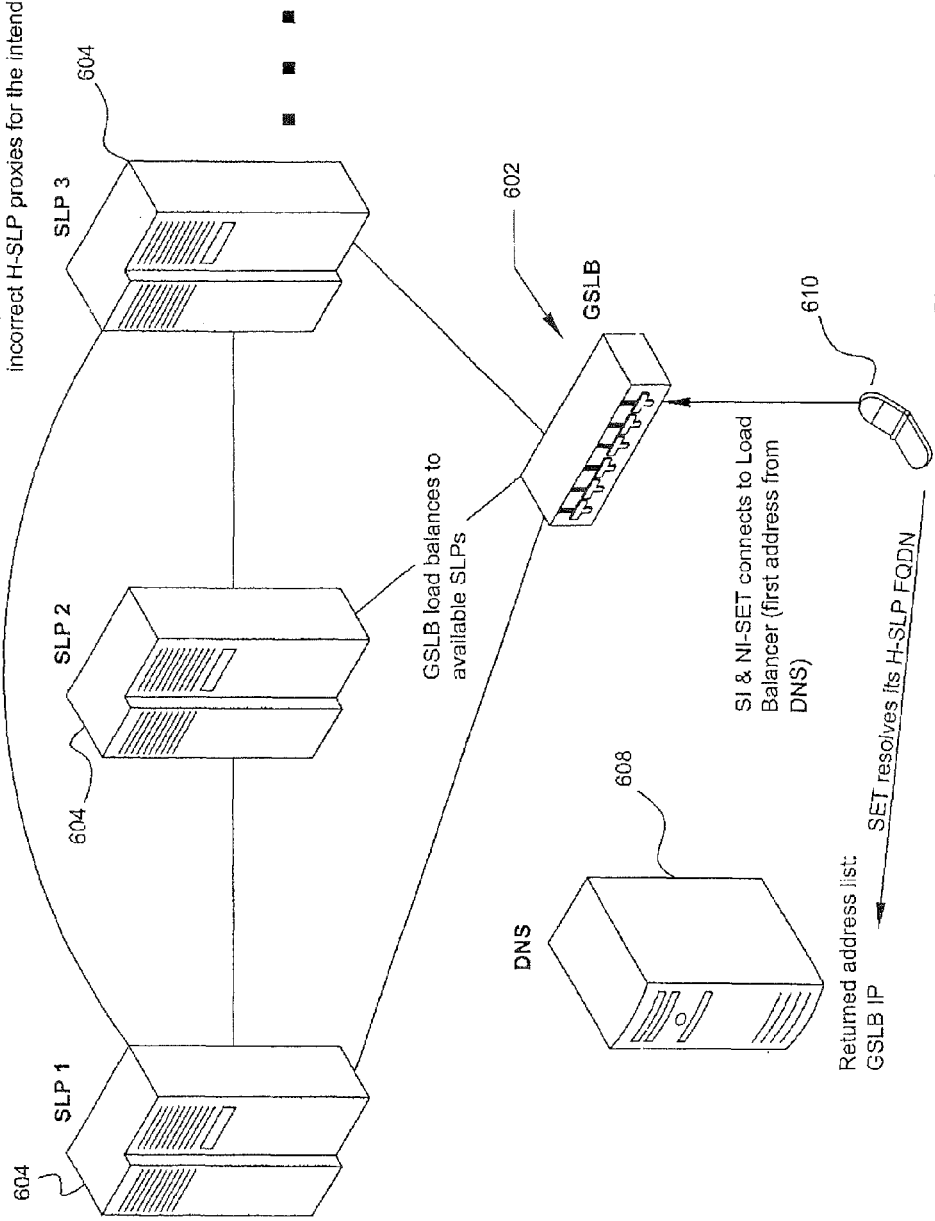
FIG. 6 is an illustration of a further embodiment of the present subject matter.

FIG. 6 is an illustration of a further embodiment of the present subject matter. With reference to FIG. 6, a GSLB mechanism 602 may be placed in front of the SLPs 604. This load balancer 602 may distribute connection attempts to available SLPs 604 (e.g., round robin, least connections, etc.) and may provide no additional SUPL intelligence. SETs 610 may continue to behave as per a SUPL 1.0 implementation, that is, the SETs 610 resolve the securely provisioned FQDN to a single IP address and initiate the connection (both SET-initiated and Network-initiated) to that address. The address returned from the DNS 608 is that of the GSLB 602. In this embodiment, however, each H-SLP may be aware of all other mated H-SLPs.

Therefore, for network initiated queries, if a SUPL POS INIT is received at an H-SLP that did not initiate the SUPL INIT, the SLPId in the received message is used to identify the correct H-SLP. From this point on the incorrect H-SLP (that is, the H-SLP the SET connected to) essentially becomes a proxy for the correct SLP.

It should be noted that no matter how many H-SLPs are deployed in an exemplary communications network, it is generally a single hop to get from an incorrect H-SLP to the correct one since the correct one is identified in the SLPId of the SUPL POS INIT message. There are plural methods that the H-SLP message relay mechanism may operate and the previous example should not limit the scope of the claims appended herewith. The following, however, should be considered in such methods, given SLP-A initiates the SUPL INIT and the SUPL POS INIT arrives at SLP-B: (i) SLP-A has the respective stored hashed message authentication code ("HMAC"—a calculated value over the transmitted SUPL INIT) that is used to authenticate the SUPL POS INIT (therefore, SLP-B cannot just complete the entire transaction and send the final result over to SLP-A); (ii) SLP-A has the outstanding MLP request, and hence the MLP response needs to be sent from SLP-A.

Two options that may then be considered for H-SLP connectivity, among others, include: (i) SLP-B essentially appears as an SET to SLP-A. That is, when an incorrect connection arrives at SLP-B, the correct H-SLP is identified by the SLPId field in the received SUPL POS INIT message. SLP-B initiates a connection attempt to SLP-A (this connection would potentially not need to be secure given the assumption that a reliable and trusted connection path exists between an operator's deployed H-SLPs). All messages may then be relayed through SLP-B between the SET and SLP-A. Thus, as far as SLP-A is concerned, it appears as though the SET has connected directly to it. The advantage, of this embodiment is that no new interface/protocols are required between H-SLPs, the existing ULP protocol is used; and (ii) State retrieval from SLP-A. That is, when the SET connection is made to SLP-B and the SUPL POS INIT message received, SLP-B retrieves the required information from SLP-A necessary to complete the transaction. The entire SUPL transaction then takes place between the SET and SLP-B. When the session is completed, the final response is sent to SLP-A allowing it to respond to the MLP query. While this embodiment minimizes relayed traffic between H-SLPs, it may require an additional proprietary interface between H-SLPs to allow state retrieval and response messaging.

An additional embodiment of the present subject matter provides an intelligent SUPL load balancer solution providing additional intelligence in the GSLB enabling the GSLB to correctly route traffic to the correct H-SLP. The intelligent SUPL load balancer solution requires no changes to the standard SUPL functionality in either the SET or SLP. This intelligent GSLB may then be responsible for ensuring the network-initiated queries are routed to the correct H-SLP.

Figure 7:
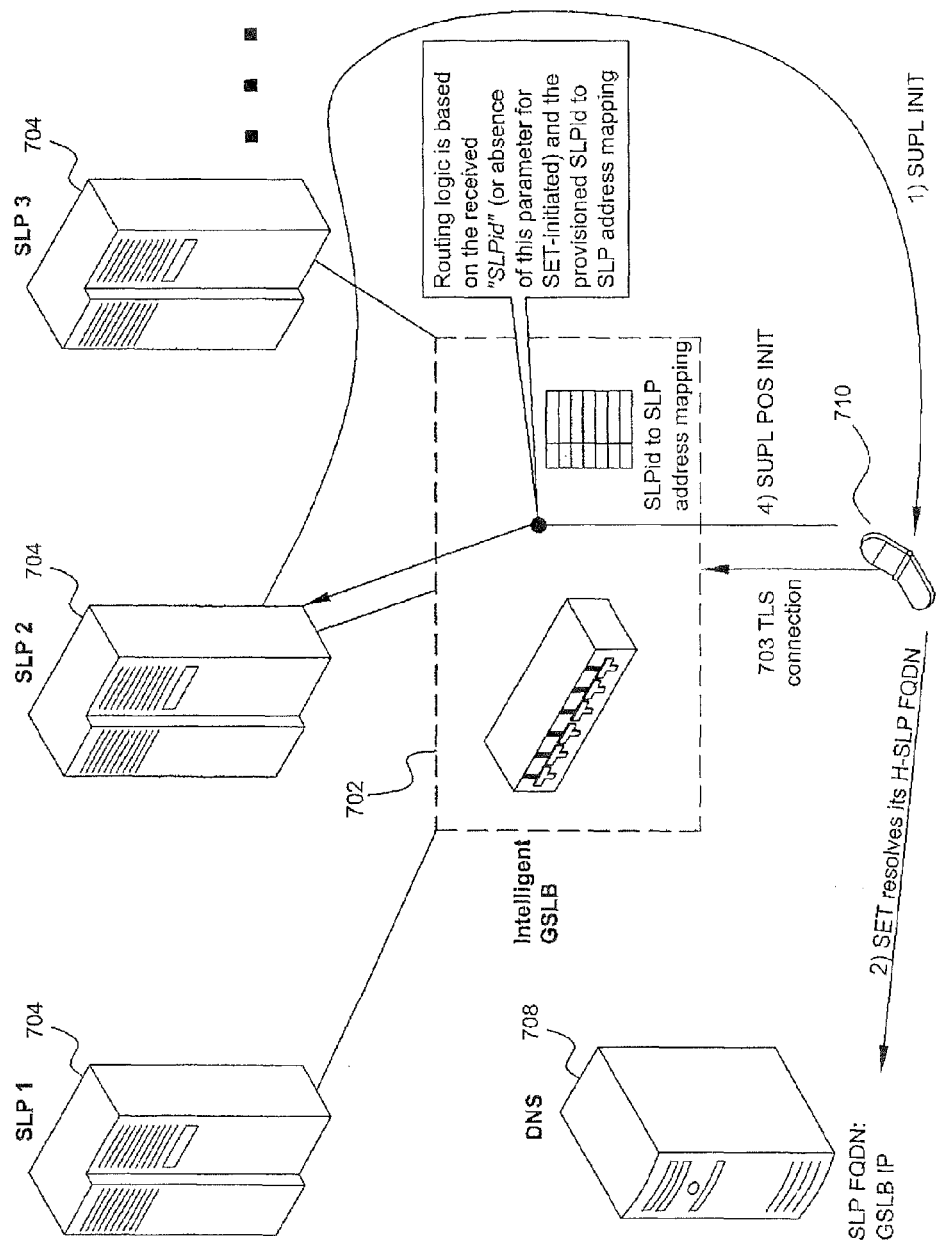
FIG. 7 is an illustration of an additional embodiment of the present subject matter.

FIG. 7 is an illustration of an additional embodiment of the present subject matter. With reference to FIG. 7, each H-SLP 704 in the network may be configured to send a unique SLPId value within the SessionId of SUPL messages. These values may be anything that conforms to the format of an FQDN (note that the value doesn't actually have to be a resolvable FQDN since it will never be used as such). The intelligent GSLB 702 may be provisioned with entries that associate each SLPId with the address of the H-SLP 704 to which the SET 710 may be connected. One non-limiting embodiment for the intelligence within the GSLB 702 may be to terminate the TLS connection 703 from the SET (therefore the GSLB would contain the SLP server certificate). The first incoming message on this connection may be examined. If the first incoming message does not contain the SLPSessionId parameter within the message header (i.e., it may be considered SET-initiated), the SET 710 may be connected to any available H-SLP 704 using any configured load balancing technique (e.g., round-robin, least connections, etc.) and the received message may be forwarded accordingly. If, however, the message contains the SLPSessionId, the SLPId may be extracted from the message header, and the provisioned address associated with that SLPId determined or "looked up". A connection to the correct H-SLP 704 may then be established, and the received message forwarded accordingly.

From this point on, anything received in either embodiment (i.e., the SET connection or the H-SLP connection) may be provided on the corresponding other side (including connection drops). The previous logic may assume that each SUPL session is performed on its own dedicated connection from the SET 710. The SUPL specifications generally allow a SET 710 to initiate a new SUPL session on an existing connection. If this is supported by both the SETs 710 and SLPs 704 in the network, then the logic within the intelligent GSLB 702 may be modified by terminating the TLS connection 703 from the SET 710 and examining the first incoming message on this connection as before; however, the SLPId value in use from the first message (or the first response from the H-SLP 704) may need to be recorded against the SLP connection. For any subsequent message received on the SET connection, the GSLB 702 would attempt to extract the SLPId parameter. Absence of the SLPId parameter may indicate a new SET-initiated query on an existing connection which can be forwarded on any existing established SLP connection. With presence of the SLPId parameter, the GSLB 702 would match the message with an already established SLP connection and forward the message on that SLP connection. If, however, the SLPId is present but fails to match any established SLP connection, the GSLB 702 may look up the provisioned address associated with the received SLPId value, establish a new connection to the corresponding SLP 704 (recording the SLPId with the connection) and forward the message on the new connection thereby resulting in multiple SLP connections being associated with the one SET connection. Further receipt of a message on any SLP connection may simply result in the received message being forwarded to the associated SET connection. The loss of an SLP connection may thus result in the associated SET connection being dropped if there are no more SLP connections associated with the SET connection. If the SET connection drops, then all associated SLP connections may be dropped.

In a further embodiment of the present subject matter, the SET 710 may augment its securely provisioned FQDN with a unique identifier from the SLPId field of the SUPL INIT. For example, if the SET 710 has the FQDN of slp.operator.net provisioned, then the SLP 704 may provide a value of 1, 2, 3, N, etc. in the SLPId field in the SUPL INIT. The SET 710 would use this SLPId value to augment the first portion of the FQDN such that the DNS query is for slpN.operator.net which would resolve to the correct SLP address to which the SET 710 may connect.

As shown by the various configurations and embodiments illustrated in FIGS. 1-7, a method and system for routing SUPL proxy-mode traffic when multiple nodes are deployed in a network have been described.

While preferred embodiments of the present subject matter have been described, it is to be understood that the embodiments described are illustrative only and that the scope of the invention is to be defined solely by the appended claims when accorded a full range of equivalence, many variations and modifications naturally occurring to those of skill in the art from a perusal hereof.

What we claim is:

1. A method for connecting a mobile device to a node in a wireless network, comprising the steps of:
   (a) receiving a query for a mobile device from a location based application;
   (b) transmitting a first message to the mobile device from an initiating secure user plane location ("SUPL") location platform ("SLP") of a plurality of SLPs in response to the query, the first message being populated with at least one predetermined parameter that identifies the initiating SLP, wherein the first message with the at least one parameter that identifies the initiating SLP is received at the mobile device;
   (c) establishing a transport layer security ("TLS") connection to a given node; and
   (d) forwarding a second message from the mobile device to the initiating SLP via the given node by associating the parameter with the initiating SLP,
   wherein the step of forwarding further comprises:
      (i) terminating the established TLS connection from the mobile device;
      (ii) examining, in response to the terminating, the content of the second message as a function of the message header; and
      (iii) selecting, in response to the examining, between (1) establishing a connection between the mobile device and any one of the plurality of SLPs in the network as a function of the availability of each of the plurality of SLPs in the network and (2) establishing a connection between the mobile device and the initiating SLP, wherein the selecting is based on an absence or presence of the at least one parameter in the message header.

2. The method of claim 1 wherein the given node is a global server load balancing ("GSLB") node.

3. The method of claim 1 wherein the at least one parameter is a fully qualified domain name (FQDN) of the initiating SLP.

4. The method of claim 1 wherein the first message is transmitted via wireless application protocol ("WAP") Push, Short message service ("SMS"), or user datagram protocol ("UDP").

5. The method of claim 1 wherein the first message is a SUPL INIT message.

6. The method of claim 1 wherein the second message is a SUPL POS INIT message.

7. The method of claim 1 wherein the initiating SLP is a home secure user plane location ("SUPL") location platform ("H-SLP").

8. The method of claim 1 wherein the query is a mobile location protocol ("MLP") query.

9. A method for connecting a mobile device to a node in a wireless network, comprising the steps of:
   (a) receiving a query for a mobile device from a location based application;
   (b) transmitting a first message to the mobile device from an initiating secure user plane location ("SUPL") location platform ("SLP") of a plurality of SLPs in response to the query, the first message being populated with at least one predetermined parameter that identifies the initiating SLP, wherein the first message with the at least one parameter that identifies the initiating SLP is received at the mobile device;
   (c) establishing a transport layer security ("TLS") connection to a given node; and
   (d) forwarding a second message from the mobile device to the initiating SLP via the given node by associating the parameter with the initiating SLP,
   wherein the step of forwarding further comprises:
      (i) terminating the established TLS connection from the mobile device;
      (ii) examining, in response to the terminating, the content of the second message as a function of the message header; and
      (iii) determining, in response to the examining, an Internet protocol address associated with the at least one parameter, and establishing a connection between the mobile device and the initiating SLP in response to determining that the second message includes the at least one parameter.

10. A method for connecting a mobile device to a node in a wireless network, comprising the steps of:
  (a) receiving a query for a mobile device from a location based application;
  (b) transmitting a first message to the mobile device from a specific secure user plane location ("SUPL") location platform ("SLP") of a plurality of SLPs in response to the query, the first message being populated with at least one predetermined parameter that identifies the specific SLP, wherein the first message with the at least one parameter that identifies the specific SLP is received at the mobile device;
  (c) establishing a transport layer security ("TLS") connection to a given node; and
  (d) determining at the given node whether to forward a second message from the mobile device to the specific SLP via the given node as a function of the availability of the specific SLP or the at least one predetermined parameter,
  wherein the step of determining further comprises:
    (i) terminating the established TLS connection from the mobile device;
    (ii) examining, in response to the terminating, the content of the second message as a function of the message header; and
    (iii) selecting, in response to the examining, between (1) establishing a connection between the mobile device and any one of the plurality of SLPs in the network as a function of the availability of each of the plurality of SLPs in the network and (2) establishing a connection between the mobile device and the specific SLP, wherein the selecting is based on an absence or presence of the at least one parameter in the message header.

11. The method of claim 10 wherein the given node is a global server load balancing ("GSLB") node.

12. The method of claim 10 wherein the at least one parameter is an SLPId having a unique identifier for the specific SLP.

13. The method of claim 10 wherein the first message is transmitted via wireless application protocol ("WAP") Push, Short message service ("SMS"), or user datagram protocol ("UDP").

14. The method of claim 10 wherein the first message is a SUPL INIT message.

15. The method of claim 10 wherein the second message is a SUPL POS INIT message.

16. The method of claim 10 wherein the specific SLP is a home secure user plane location ("SUPL") location platform ("H-SLP").

17. A method for connecting a mobile device to a node in a wireless network, comprising the steps of:
  (a) receiving a query for a mobile device from a location based application;
  (b) transmitting a first message to the mobile device from a specific secure user plane location ("SUPL") location platform ("SLP") of a plurality of SLPs in response to the query, the first message being populated with at least one predetermined parameter that identifies the first SLP, wherein the first message with the at least one parameter that identifies the specific SLP is received at the mobile device;
  (c) establishing a transport layer security ("TLS") connection to a given node; and
  (d) determining at the given node whether to forward a second message from the mobile device to the specific SLP via the given node as a function of the availability of the specific SLP or the at least one predetermined parameter,
  wherein the step of determining further comprises:
    (i) terminating the established TLS connection from the mobile device;
    (ii) examining, in response to the terminating, the content of the second message as a function of the message header; and
    (iii) determining, in response to the examining, an Internet protocol address associated with the at least one parameter, and establishing a connection between the mobile device and the initiating SLP in response to determining that the second message includes the at least one parameter.

* * * * *